United States Patent
Turtinen et al.

(10) Patent No.: US 12,267,864 B2
(45) Date of Patent: Apr. 1, 2025

(54) SELECTION OF CHANNEL ACCESS PRIORITY

(71) Applicant: Nokia Technologies Oy, Espoo (FI)

(72) Inventors: Samuli Turtinen, Ii (FI); Chunli Wu, Beijing (CN); Jarkko Koskela, Oulu (FI); Ping-Heng Kuo, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 255 days.

(21) Appl. No.: 17/606,196

(22) PCT Filed: May 2, 2019

(86) PCT No.: PCT/CN2019/085418
§ 371 (c)(1),
(2) Date: Oct. 25, 2021

(87) PCT Pub. No.: WO2020/220377
PCT Pub. Date: Nov. 5, 2020

(65) Prior Publication Data
US 2022/0217735 A1    Jul. 7, 2022

(51) Int. Cl.
*H04W 72/566*    (2023.01)

(52) U.S. Cl.
CPC .................. *H04W 72/569* (2023.01)

(58) Field of Classification Search
CPC ........... H04W 72/569; H04W 72/1263; H04W 74/0808
See application file for complete search history.

(56) References Cited

U.S. PATENT DOCUMENTS

| | | | |
|---|---|---|---|
| 2016/0285526 A1* | 9/2016 | Hedayat | H04L 5/0037 |
| 2016/0294511 A1* | 10/2016 | Maheshwari | H04L 69/22 |
| 2017/0238312 A1 | 8/2017 | Chen et al. | |
| 2017/0318595 A1 | 11/2017 | Dinan et al. | |
| 2018/0049220 A1 | 2/2018 | Patil et al. | |
| 2018/0270698 A1 | 9/2018 | Babaei et al. | |
| 2019/0297644 A1 | 9/2019 | Babaei et al. | |

(Continued)

FOREIGN PATENT DOCUMENTS

| | | |
|---|---|---|
| CN | 108322939 A | 7/2018 |
| CN | 109076580 A | 12/2018 |

(Continued)

OTHER PUBLICATIONS

MediaTek, "Configured grant enhancements for NR-U", 3GPP TSG-RAN WG2 Meeting #103 Gothenburg, Sweden, Aug. 2018 (Year: 2018).*

(Continued)

*Primary Examiner* — Siming Liu
(74) *Attorney, Agent, or Firm* — Robert P. Michal, Esq.; Carter, DeLuca & Farrell LLP

(57) ABSTRACT

Example embodiments of the present disclosure relate to devices, methods, apparatuses and computer readable storage medium for selection of a channel access priority. In example embodiments, a subset of data units from a set of data units is selected for multiplexing into a data packet. The selecting is at least in part based on a channel access priority associated with each of the subset of data unit. The subset of data units is multiplexed into the data packet, and then the data packet is transmitted.

1 Claim, 4 Drawing Sheets

(56) References Cited

U.S. PATENT DOCUMENTS

2020/0314745 A1* 10/2020 Yi .................... H04W 72/23
2020/0337083 A1* 10/2020 Loehr ............... H04W 72/1263

FOREIGN PATENT DOCUMENTS

| | | |
|---|---|---|
| CN | 109478991 A | 3/2019 |
| WO | 2010/043963 A1 | 4/2010 |

OTHER PUBLICATIONS

Huawei, HiSilicon, "Multiplexing of data for AUL", 3GPP TSG-RAN WG2 Meeting #99bis Prague, Czech Republic, Oct. 9-13, 2017, R2-1710367 (Year: 2017).*

Office Action received for corresponding Indian Patent Application No. 202147055096, dated Mar. 29, 2022, 6 pages.

"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.

"New WID on NR-based Access to Unlicensed Spectrum", 3GPP TSG RAN Meeting #82, RP-182878, Agenda:9.1.1, Qualcomm Incorporated, Dec. 10-13, 2018, 8 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.5.0 , Mar. 2019, pp. 1-363.

"3rd Generation Partnership Project; Technical Specification Group Radio Access Network; Evolved Universal Terrestrial Radio Access (E-UTRA); Physical layer procedures (Release 15)", 3GPP TS 36.213, V15.5.0, Mar. 2019, pp. 1-552.

"3rd Generation Partnership Project; Technical Specification Group Radio Access Network; Physical layer procedures for shared spectrum channel access (Release 15)", 3GPP TS 37.213, V15.2.0, Mar. 2019, pp. 1-20.

"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.

International Search Report and Written Opinion received for corresponding Patent Cooperation Treaty Application No. PCT/CN2019/085418, dated Feb. 12, 2020, 9 pages.

"Configured grant enhancements for NR-U", 3GPP TSG-RAN WG2 Meeting #103, R2-1812340, Agenda:11.2.1.2, MediaTek Inc, Aug. 20-24, 2018, 3 pages.

"Other aspects of autonomous UL access", 3GPP TSG-RAN WG2 Meeting #101, R2-1802893, Agenda: 9.12.2, Intel Corporation, Feb. 22-Mar. 2, 2018, 6 pages.

Extended European Search Report received for corresponding European Patent Application No. 19927409.3, dated Nov. 14, 2022, 8 pages.

Office Action received for corresponding European Patent Application No. 19927409.3, dated Nov. 28, 2023, 6 pages.

Office Action received for corresponding Chinese Patent Application No. 201980098133.8, dated Dec. 26, 2023, 10 pages of Office Action with English translation (10 pages), total 20 pages.

"Multiplexing of data for AUL", 3GPP TSG-RAN WG2 Meeting #99bis, R2-1710367, Agenda Item: 9.12.2, Huawei, Oct. 9-13, 2017, 4 pages.

"UL data multiplexing and channel access priority", 3GPP TSG RAN WG2 NR #105bis Meeting, R2-1903540, Agenda Item: 11.2.3, ZTE Corporation, Apr. 8-12, 2019, 4 pages.

Office Action received for corresponding Chinese Patent Application No. 201980098133.8, dated May 24, 2024, 7 pages of Office Action and 6 pages of translation available.

Office Action received for corresponding Chinese Patent Application No. 201980098133.8, dated Aug. 5, 2024, 6 pages of Office Action and no page of translation available.

Office Action received for corresponding Chinese Patent Application No. 201980098133.8, dated Dec. 13, 2024, 7 pages of Office Action and no page of translation available.

* cited by examiner

SELECTION OF CHANNEL ACCESS PRIORITY

RELATED APPLICATION

This application claims priority to PCT Application No. PCT/CN2019/085418, filed on May 2, 2019, each of which is incorporated herein by reference in its entirety.

FIELD

Example embodiments of the present disclosure generally relate to the field of communications, and in particular, to devices, methods, apparatuses and computer readable storage media for selection of a channel access priority.

BACKGROUND

Licensed-Assisted Access (LAA) is a technology to leverage unlicensed spectrum in combination with licensed spectrum through carrier aggregation (CA) to enhance system performance in Long Term Evolution (LTE). In LAA, at least one Secondary Cell (SCell) operating in the unlicensed spectrum is allocated to user equipment (UE). Due to the sharing feature of the unlicensed spectrum, evolved NodeB (eNB) and UE may apply Listen-Before-Talk (LBT) before performing a transmission on LAA SCell. During LBT, a transmitter listens to or senses a channel in the unlicensed spectrum to determine whether the channel is free or busy. If the channel is determined to be free, the transmitter may initiate the transmission.

If no channel is free, the transmitter will wait for a contention window to perform LBT again. A size of the condition window may be adapted based on a Channel Access Priority Class (CAPC). Typically, a transmission with a higher CAPC priority (that is, a lower CAPC number) may use a shorter condition window to have more chances to acquire the channel. Four CAPCs are defined in the third generation Partnership Project (3GPP) TS 36.213/37.213 for use in uplink (UL) and downlink (DL) transmissions on LAA carriers. The CAPC is associated with a Quality of Service Class Identifier (QCI) identifying which Quality of Service (QoS) class that traffic to be transmitted belongs to.

Before LBT, upon reception of an UL grant from the eNB, the UE may multiplex several Medium Access Control (MAC) Service Data Units (SDUs) or MAC Control Elements (CEs) into a MAC Protocol Data Unit (PDU) and then select a CAPC for this UL grant. In LTE Autonomous Uplink (AUL) transmission, the UE will select the lowest CAPC priority based on the MAC SDUs multiplexed into the MAC PDU. This will result in use of a lower CAPC priority for data with a higher CAPC priority, thereby degrading the QoS of the data.

SUMMARY

In general, example embodiments of the present disclosure provide devices, methods, apparatuses and computer readable storage media for selection of a channel access priority.

In a first aspect, a device is provided. The device comprises at least one processor and at least one memory including computer program code. The at least one memory and the computer program code are configured to, with the at least one processor, cause the device to select a subset of data units from a set of data units for multiplexing into a data packet. The selecting is at least in part based on a channel access priority associated with each of the subset of data unit. The device is further caused to multiplex the subset of data units into the data packet, and then transmit the data packet.

In a second aspect, a device is provided. The device comprises at least one processor and at least one memory including computer program code. The at least one memory and the computer program code are configured to, with the at least one processor, cause the device to determine a plurality of channel access priorities associated with a plurality of data units multiplexed into a data packet to be transmitted. The device is caused to select a channel access priority from the plurality of channel access priorities based on a threshold priority; and. The device is further caused to transmit the data packet according to the selected channel access priority.

In a third aspect, a method is provided. In the method, a subset of data units from a set of data units is selected for multiplexing into a data packet. The selecting is at least in part based on a channel access priority associated with each of the subset of data unit. The subset of data units is multiplexed into the data packet, and then the data packet is transmitted.

In a fourth aspect, a method is provided. In the method, a plurality of channel access priorities are determined to be associated with a plurality of data units multiplexed into a data packet to be transmitted. A channel access priority is selected from the plurality of channel access priorities based on a threshold priority. Further, the data packet is transmitted according to the selected channel access priority.

In a fifth aspect, there is provided an apparatus comprising means for performing the steps of the method according to the third or fourth aspect.

In a sixth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
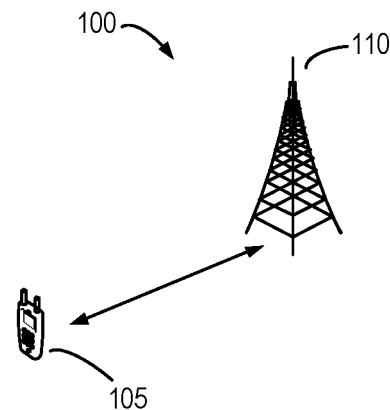
FIG. 1 illustrates an example scenario in which some example embodiments of the present disclosure can be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the network device on predetermined schedules, when triggered by an internal or external event, or in response to requests from the network side.

Examples of the UE include, but are not limited to, user equipment (UE) such as smart phones, wireless-enabled tablet computers, laptop-embedded equipment (LEE), laptop-mounted equipment (LME), wireless customer-premises equipment (CPE), sensors, metering devices, personal wearables such as watches etc., and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "network device" refers to a device via which services can be provided to a terminal device in a communication network. Examples of the network device may include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "data" refers to any useful information to be transmitted. The data may include control signaling, voice, useful data, and the like. As used herein, the term "data unit" refers to a basic unit for data transmission. The data unit may be implemented in any suitable form and may comply with any suitable protocol in any suitable layer. In some example embodiments, the data unit may include a Medium Access Control (MAC) Service Data Unit (SDU) or a MAC Control Element (CE) and the like. In various example embodiments of the present disclosure, the data unit or data can be multiplexed or packaged into a data packet.

As used herein, the term "data packet" refers to a data block carrying, containing or including one or more data units. The data packet may comply with any suitable protocol such as Internet Protocol (IP), Transmission Control Protocol (TCP), User Datagram Protocol (UDP) and the like. The protocols in any suitable layer may be applicable. For example, the layer may include an IP layer, a Radio Resource Control (RRC) layer, a Medium Access Control (MAC) layer, a Physical (PHY) Layer and the like.

As used herein, the term "circuitry" may refer to one or more or all of the following:
 (a) hardware-only circuit implementations (such as implementations in only analog and/or digital circuitry) and
 (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

For LAA and CAPC, the following has been defined in 3GPP TS 36.300:

5.7 Licensed-Assisted Access

Carrier aggregation with at least one SCell operating in the unlicensed spectrum is referred to as Licensed-Assisted Access (LAA). In LAA, the configured set of serving cells for a UE therefore always includes at least one SCell operating in the unlicensed spectrum according to Frame structure Type 3, also called LAA SCell. Unless otherwise specified, LAA SCells act as regular SCells.

If the absence of IEEE802.11n/11ac devices sharing the carrier cannot be guaranteed on a long term basis (e.g., by level of regulation), and for this release if the maximum number of unlicensed channels that E-UTRAN can simultaneously transmit on is equal to or less than 4, the maximum frequency separation between any two carrier center frequencies on which LAA SCell transmissions are performed should be less than or equal to 62 MHz. The UE is required to support frequency separation in accordance with TS 36.133 [21].

LAA eNB and UE apply Listen-Before-Talk (LBT) before performing a transmission on LAA SCell. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it shall continue to meet the LAA maximum energy detection threshold requirement.

The combined time of transmissions compliant with the channel access procedure described in clause 15.1.2 of TS 36.213 [6] by an eNB should not exceed 50 ins in any contiguous 1 second period on an LAA SCell.

Which LBT type (i.e. type 1 or type 2 uplink channel access) the UE applies is signalled via uplink grant for uplink PUSCH transmission on LAA SCells, except for Autonomous Uplink (AUL) transmissions.

For type 1 uplink channel access on AUL, E-UTRAN signals the Channel Access Priority Class for each logical channel and UE shall select the lowest Channel Access Priority Class (i.e, with a higher number in the Table 5.7.1-1) of the logical channel(s) with MAC SDU multiplexed into the MAC PDU. The MAC CEs except padding BSR use the highest Channel Access Priority Class (i.e, the lowest number in the Table 5.7.1-1).

For type 2 uplink channel access on AUL, the UE may select logical channels corresponding to any Channel Access Priority Class for UL transmission in the subframes signalled by E-UTRAN in common downlink control signalling.

For uplink LAA operation, the eNB shall not schedule the UE more subframes than the minimum necessary to transmit all the traffic corresponding to the selected Channel Access Priority Class or lower (i.e, with a lower number in the Table 5.7.1-1), than the:
Channel Access Priority Class signaled in UL grant based on the latest BSR and received uplink traffic from the UE if type 1 uplink channel access procedure (see clause 15.2.1.1 of TS 36.213 [6]) is signalled to the UE;
Channel Access Priority Class used by the eNB based on the downlink traffic, the latest BSR and received UL traffic from the UE if type 2 uplink channel access procedure (see clause 15.2.1.2 of TS 36.213 [6]) is signalled to the UE.

5.7.1 Channel Access Priority Classes

Four Channel Access Priority Classes are defined in TS 36.213 [6] which can be used when performing uplink and downlink transmissions in LAA carriers. Table 5.7.1-1 shows which Channel Access Priority Class should be used by traffic belonging to the different standardized QCIs. A non-standardized QCI (i.e. Operator specific QCI) should use suitable Channel Access Priority Class based on the below table, i.e. the Channel Access Priority Class used for a non-standardized QCI should be the Channel Access Priority Class of the standardized QCIs which best matches the traffic class of the non-standardized QCI.

For uplink, the eNB selects the Channel Access Priority Class by taking into account the lowest priority QCI in a Logical Channel Group.

TABLE 5.7.1-1

Mapping between Channel Access Priority Classes and QCI

| Channel Access Priority Class (p) | QCI |
|---|---|
| 1 | 1, 3, 5, 65, 66, 69, 70 |
| 2 | 2, 7 |
| 3 | 4, 6, 8, 9 |
| 4 | — |

5.7.2 Multiplexing of Data

Four Channel Access Priority Classes are defined in TS 36.213 [6]. If a DL transmission burst with PDSCH is transmitted, for which channel access has been obtained using Channel Access Priority Class P (1 . . . 4), E-UTRAN shall ensure the following where a DL transmission burst refers to the continuous transmission by E-UTRAN after a successful LBT:

the transmission duration of the DL transmission burst shall not exceed the minimum duration needed to transmit all available buffered traffic corresponding to Channel Access Priority Class(es)≤P;

the transmission duration of the DL transmission burst shall not exceed the Maximum Channel Occupancy Time ($T_{mcot,p}$ as defined in Table 15.1.1-1 of TS 36.213 [6]) for Channel Access Priority Class P;

additional traffic corresponding to Channel Access Priority Class(s)>P may only be included in the DL transmission burst once no more data corresponding to Channel Access Priority Class≤P is available for transmission. In such cases, E-UTRAN should maximise occupancy of the remaining transmission resources in the DL transmission burst with this additional traffic.

For uplink PUSCH transmission, there is no additional restriction at the UE (other than the multiplexing rules defined in clause 5.4.3 of TS 36.321 [13]) on the type of the traffic that can be carried in the scheduled subframes.

For each UL grant, the UE may perform a Logical Channel Prioritization (LCP) procedure. The LCP procedure requires the UE to multiplex data from different Logical Channels (LCHs) for the UL grant based on LCH priorities, prioritized bit rates (PBR), bucket sizes and the like. The LCP procedure in the fifth generation (5G) New Radio (NR) has been defined in 3GPP TS 38.321. For CAPC selection for NR-based access to Unlicensed Spectrum (NR-U) in 5G NR, the following has been agreed:

A table for mapping between 5G QoS Indicator (5QI) and CAPC, similar to Table 5.7.1-1 in 3GPP TS 36.300, shall be specified.

All MAC CEs, except for padding Buffer Status Report (BSR) MAC CE, uses the highest CAPC priority, which has the lowest CAPC number as shown in Table 5.7.1-1 in 3GPP TS 36.300, and it is for further study (FFS) for a recommended rate for Voice MAC CEs.

It is FFS if for configured grants (CGs), when several MAC SDUs are multiplexed, CAPC is selected according to the configuration for a LCH with the lowest CAPC priority for Data Radio Bearers (DRBs), for example.

As described above, the CAPC selection was left FFS for the configured grants (CG) in NR-U. In LTE AUL transmission, the UE will select the lowest CAPC priority based on MAC SDUs or MAC CEs multiplexed into a MAC PDU. This will result in the use of a lower CAPC priority for data with a higher CAPC priority and thus undesirable degradation of the transmission efficiency of the data. For example, large latency may be induced in transmitting the data with the higher CAPC priority. A straightforward solution is to restrict data of only certain LCHs to be mapped to a CG. However, this may lead to unnecessary underutilization of the grant in case such LCHs have less data or even no data available.

In one aspect, some example embodiments of the present disclosure provide a mapping mechanism for mapping data with different channel access priorities to a configured grant. The mapping mechanism requires that when selecting a subset of data units from a set of data unit for multiplexing into a data packet, the subset of data units is selected at least in part based on a channel access priority of each data unit in the subset of data units. The selection may be based on a threshold priority. For example, a data unit with a channel access priority higher than, equal to or lower than the threshold priority may be selected from the set of data units.

For example, in the case where a data unit with a channel access priority higher than and equal the threshold priority are selected for multiplexing into a data packet, if a channel access priority for the data packet is determined as the lowest channel access priority associated with the multiplexed data units, the higher channel access priorities associated with the multiplexed data units may not be downgraded severely. Accordingly, chances of accessing a channel may be increased, utilization of the configured grant may be increased, and transmission latency and efficiency of the whole data packet may be improved.

In another aspect, some example embodiments of the present disclosure provide a selection mechanism of a channel access priority for the configured grant. According to the selection mechanism, a channel access priority for a data packet to be transmitted is selected, based on a threshold priority, from a plurality of channel access priorities associated with a plurality of data units multiplexed into the data packet. Such selection mechanism is more flexible.

The threshold priority may be associated with a channel access priority or a logical channel (LCH) priority in a Medium Access Control (MAC) layer. As an example, the channel access priority may be selected based on comparison of the plurality of channel access priorities and the threshold priority or based on comparison of a plurality of LCH priorities of the multiplexed data units and the threshold priority. If at least one of the channel access priorities is higher than or equal to a threshold priority, or at least one of the LCH priorities is higher than or equal to a threshold priority, a higher channel access priority may be selected. Otherwise, a lower channel access priority may be selected. As such, the higher channel access priority can be selected depending on the channel access priorities or LCH priorities of the data units multiplexed into the data packet or transport block (TB).

In this way, if a data unit multiplexed into a data packet has a higher channel access priority or a higher LCH priority than a threshold priority, a higher channel access priority may be selected as the channel access priority of the data packet. Thus, a data unit with the higher channel access priority may not be degraded severely due to multiplexing with a data unit with a very low channel access priority.

It is to be understood that the mapping mechanism and the selection mechanism according to some example embodiments of the present disclosure may be used by any suitable device, entity, functionality or unit, such as a terminal device or a network device, in a communication network. The scope of the present disclosure will not be limited in this regard.

FIG. 1 shows an example environment 100 in which example embodiments of the present disclosure can be implemented. The environment 100, which may be a part of a communication network, comprises a terminal device 105 and a network device 110. Both the terminal device 105 and the network device 110 can operate in the unlicensed and/or licensed spectrum.

It is to be understood that one terminal device and one network devices are shown in the environment 100 only for the purpose of illustration, without suggesting any limitation to the scope of the present disclosure. Any suitable number of network devices and terminal devices may be included in the environment 100.

The terminal device 105 can communicate with the network device 110 or with another terminal device (not shown) directly or via the network device 110. The communication may follow any suitable communication standards or protocols such as Universal Mobile Telecommunications System (UMTS), long term evolution (LTE), LTE-Advanced (LTE-A), the fifth generation (5G) NR, Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connectivity (DC), and New Radio Unlicensed (NR-U) technologies.

Before performing the transmission, the terminal device 105 or the network device 110 can multiplex a plurality of data units with different channel access priorities into a data packet to be transmitted. In some example embodiments, a subset of data units from a set of data units may be selected for the multiplexing, at least in part based on a channel access priority associated with each of the selected data units.

The selection of the data units may be determined based on a threshold priority. The threshold priority may be defined or configured by the network device 110 and indicated to the terminal device 105. For example, the network device 110 may transmit a multiplexing configuration indicating the threshold priority to the terminal device 105 via Radio Resource Control (RRC) signaling. Accordingly, the terminal device 105 may receive the multiplexing configuration indicating the threshold priority. The multiplexing configuration may also indicate t selection rule related to the threshold priority.

In some example embodiments, the selection behavior of a channel access priority for the data packet may be dynamic or adaptive. The channel access priority of the data packet can be selected based on a threshold priority. A lower channel access priority (for example, the lowest channel access priority) or a higher channel access priority (for example, the highest channel access priority) may be selected based on the threshold priority according to practical requirements to improve the transmission efficiency of the whole data packet. For example, the selection of the lower or higher channel access priority may depend on the determination of whether a data unit with a certain channel access priority (for example, represented by CAPC P in a MAC layer) or with a channel access priority higher than a threshold priority (for example, represented by CAPC X) is multiplexed in the data packet. Alternatively, in the MAC layer, the selection may depend on the determination of whether a data unit with a certain LCH priority or with a LCH priority higher than a threshold priority is multiplexed in the data packet.

Figure 2:
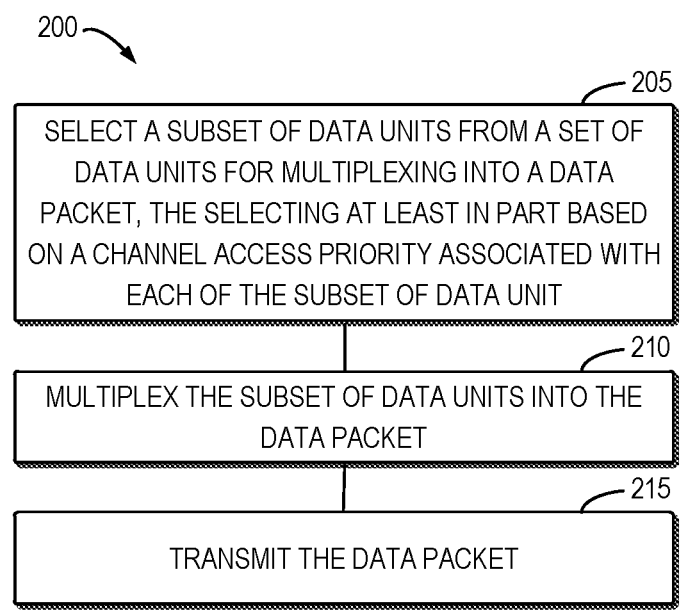
FIG. 2 illustrates a flowchart of an example method of transmitting a data packet according to some example embodiments of the present disclosure.

FIG. 2 shows a flowchart of an example method 200 of transmitting a data packet according to some example embodiments of the present disclosure. The method 200 can be implemented by the terminal device 105 or the network device 110 as shown in FIG. 1 in any suitable layer. As an example, the method 200 may be implemented by a MAC entity of the terminal device 105 in the MAC layer. For the purpose of discussion, the method 200 will be described with reference to FIG. 1.

At block 205, a subset of data units from a set of data units is selected for multiplexing into a data packet at least in part based on the a channel access priority associated with each of a data unit in the subset of data units. The set of data units may comprise all of available data units or a part of the available data units that may be determined after a logical channel prioritization (LCP) procedure.

Any suitable form of data unit and data packet may be applicable herein. In the example embodiments where the multiplexing is implemented in the MAC layer, the data packet may comprise a MAC PDU, and the data unit may comprise a MAC SDU or a MAC CE. The MAC SDUs may belong to different LCHs. For example, for a configured grant, data from MAC SDUs of different LCHs and/or data from different MAC CEs may be multiplexed into a MAC PDU. The LCHs may be associated with different radio bears, such as a signaling radio bearer (SRB) and a data radio bearer (DRB). The MAC CEs may be used for Power Headroom Report (PHR) or Buffer Status Report (BSR), for example.

In this case, the channel access priority is represented by a CAPC priority. A CAPC priority associated with a data unit is determined to be the CAPC configured for a Data Radio Bearer (DRB) or a Logical Channel (LCH) to which the data unit belongs, or determined to be a CAPC priority configured for a MAC CE. In some example embodiments, the channel access priority may comply with the 3GPP specifications such as 3GPP TS 36.300 or other future specifications. Other forms of the channel access priority may also possible.

In some example embodiments, the subset of data units may be selected based on a threshold priority according to a related selection rule. In some embodiments, the threshold priority and/or the related determination rule may be defined or configured by the network device 110 and indicated to the terminal device 105 in a multiplexing configuration via RRC signaling. In some example embodiments, the threshold priority and/or the selection rule may be defined or be configured per configured grant, per CAPC class, per LCH priority, per LCH, or per MAC CE. For example, each LCH or MAC CE may be configured with a threshold priority to indicate the lowest priority level of other LCHs or MAC CEs that can be multiplexed into the same packet with the LCH or MAC CE.

Any suitable selection rule based on the threshold priority may be configured. In some example embodiments, it may be configured that if a channel access priority associated with a data unit is higher than or equal to the threshold priority, the data unit is allowed to be multiplexed into the data packet. Accordingly, a data unit higher than or equal to the threshold priority may be selected from the set of data units. For example, in the MAC layer, a LCH with a higher CAPC priority compared with the threshold priority may be selected for multiplexing into a MAC PDU. In this example, if a CAPC for the MAC PDU is determined as the lowest CAPC priority associated with the selected LCHs, the higher CAPC priorities associated with the LCHs may not be downgraded severely, and therefore the transmission efficiency of the whole data packet may be improved.

In some example embodiments, if it is configured that a data unit with a channel access priority equal to the threshold priority is allowed to be multiplexed, a data unit with a channel access priority equal to the threshold priority may be selected. It is also possible to configure that a data unit with a channel access priority below the threshold priority is allowed to be multiplexed. Accordingly, a data unit with a channel access priority below the threshold priority may be selected.

The threshold priority may be set as any suitable value. In some embodiments, the threshold priority may be set as a predefined value. For example, in the example embodiments where the threshold priority is represented by a CAPC of a LCH, the threshold priority may be set as CAPC=Y. In this example, LCHs with CAPC=Y and/or higher than Y and/or smaller than Y may be selected for a configured grant.

In some example embodiments, the predefined value may be associated with a channel access priority of one of the selected subset of data units. For example, in the example embodiments where the plurality of data units belongs or corresponds to different LCHs, the threshold priority may be set as CAPC X, where X>P and P is a CAPC of a data unit of the plurality of data units. In some example embodiments, LCHs with channel access priorities higher than or equal to the threshold priority (represented by the CAPC X) may be selected. In some example embodiments, the threshold priority may be set as a channel access priority of one of the selected data units. For example, the threshold priority may be set as a CAPC P of a selected LCH. LCHs with CAPC<P, that is, LCHs with higher channel access priorities than the LCH with CAPC P, may be selected. Accordingly, the degradation of the higher channel access priority associated with the selected LCHs may be mitigated by avoiding the multiplexing with a LCH with a too low channel access priority.

In addition to the threshold priority, the data unit selection may depend on other rules or configurations. In some example embodiments, a predetermined number of data units with highest channel access priorities may be selected from the set of data units for multiplexing into the data packet. The specific number may be configured by the network device 110 and indicated to the terminal device 105.

For example, the network device 110 configures a relative channel access priority compared to the highest channel access priority multiplexed for the configured grant. As an example, the network device 110 may allow the terminal device 105 to multiplex, for example, data units with 2-step lower CAPC priorities compared to the data unit having the highest CAPC priority. In this case, if the first LCH has CAPC 2, the terminal device 105 could multiplex data from LCHs having CAPC values 3 and 4. If the first LCH has CAPC 1, then only LCHs with CAPC 2 and 3 would be allowed. This could be a simple configuration.

In some example embodiments, a plurality of data units may be selected from the set of data units according to a descending order of a plurality of channel access priorities associated with the plurality of data units. Accordingly, a data unit associated with a lower channel access priority is selected after a data unit with a higher channel access priority. The prioritization of selecting a data unit with a higher priority may further improve the transmission efficiency of the data unit having a higher channel access priority.

In some example embodiment, the selection of the data units may be performed in the MAC layer according to a descending order of the associated LCH priorities one by one. For example, the MAC entity of the terminal device 105 may first select a data unit with the highest LCH priority and checks whether any selection configuration related to the channel access priority is configured for the LCH priority or the given LCH of the data unit. If no, the MAC entity may continue to select and check a LCH with the second highest LCH priority represented by CAPC P. If there is a restriction for this LCH that a LCH with a CAPC higher than, for example, CAPC P+1 shall not be multiplexed, the MAC entity selects a data unit corresponding to the LCH with CAPC P and checks whether there is a LCH with CAPC P+1. If yes, the MAC entity can select a data unit from the LCH with CAPC P+1. If there is a LCH with CAPC+2 or above, such a LCH cannot be mapped to this grant so as to not lower down CAPC of the MAC PDU too much. Alternatively, the above selection process may be performed based on the channel access priorities instead of the LCH priorities or the LCH.

In some example embodiment, the selection of the data units may be performed in the MAC layer according to a descending order of the associated LCH priorities one by one considering only the LCHs with data available for transmission. For example, the MAC entity of the terminal device 105 may first select a data unit with the highest LCH priority with data available for transmission and checks whether any selection configuration related to the channel access priority is configured for the LCH priority or the given LCH of the data unit. If no, the MAC entity may continue to select and check a LCH with the second highest LCH priority with data available for transmission represented by CAPC P. If there is a restriction for this LCH that a LCH with a CAPC higher than, for example, CAPC P+1 shall not be multiplexed, the MAC entity selects a data unit corresponding to the LCH with CAPC P and checks whether there is a LCH with CAPC P+1 with data available for transmission. If yes, the MAC entity can select a data unit from the LCH with CAPC P+1. If there is a LCH with CAPC+2 or above, such a LCH cannot be mapped to this grant so as to not lower down CAPC of the MAC PDU too much. Hence, for example, the threshold priority (determined herein by the CAPC P+1) for a given UL grant is determined based on the threshold priority configured for the logical channel with the highest LCH priority with data available for transmission and configured with the threshold priority value. Alternatively, the above selection process may be performed based on the channel access priorities instead of the LCH priorities or the LCH.

In addition to the channel access priority, other parameters or factors may be considered when selecting a subset of data units from the set of data units. In some example embodiments, the subset of data units may be selected such that a utilization of a transport block (TB) for the data packet is equal to or higher than a threshold utilization. For example, after a data unit is selected, it may be determined whether the utilization of the TB for the data packet is below the threshold utilization. If yes, the terminal device 105 may continue to select a further data unit to ensure the utilization of the TB.

In some example embodiments, the data units may be selected such that amount of padding in the data packet is below threshold amount. For example, after a data unit is selected, it is determined whether the amount of padding in the data packet is higher than threshold amount. If yes, terminal device 105 may continue to select a further data unit to further improve the transmission efficiency.

When the utilization of the TB exceeds the threshold utilization or the amount of padding decreases down to the threshold amount, no more data units may be selected. The TB may be filled with padding. Accordingly, in the case that the selection of a data unit with a higher channel access priority is prioritized over a data unit with a lower channel access priority, padding may achieve more transmission efficiency than multiplexing the data with a too low priority, and therefore the transmission efficiency of the whole data packet may be improved.

In some example embodiments, the selection of the data units is performed during a LCP procedure. In this case, various related criteria or parameters may be considered including the rules related to the channel access priorities and LCP rules related to the associated LCH priorities, PBRs, bucket sizes and the like. In some example embodiments, a threshold priority or other selection rules related to the channel access priority may be configured or determined for each UL grant based on a threshold priority or selection rules configured for a data unit (or a LCH) having data available for transmission and with the highest channel access priority. With the consideration of the channel access priorities, certain LCHs or MAC CEs cannot be multiplexed into the MAC PDU even if the LCHs have data available.

In some example embodiments, in the selection of the data units, the channel access priority may be considered after the LCP procedure. An example process of using the channel access priority after the LCP procedure will be discussed below with reference to FIG. 3.

Figure 3:
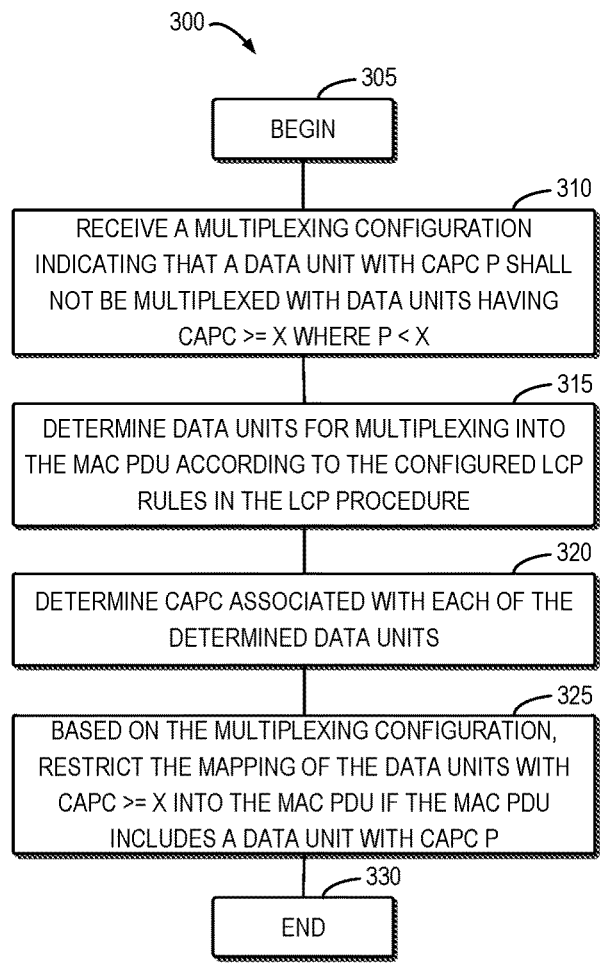
FIG. 3 illustrates a flowchart of an example method of selecting a subset of data units from a set of data units for multiplexing into a data packet according to some embodiments of the present disclosure.

FIG. 3 shows a flowchart of an example process 300 of selecting a subset of data units from a set of data units for multiplexing into a data packet according to some example embodiments of the present disclosure. The process 300 can be implemented by the terminal device 105 as shown in FIG. 1.

As shown, after the method 300 begins at block 305, at block 310, the terminal device 105 receives a multiplexing configuration indicating that a data unit (including SDUs and MAC CEs) with CAPC P shall not be multiplexed with data units having CAPC>=X where P<X. At block 315, the terminal device 105 determines data units to for multiplexing into the MAC PDU according to the configured LCP rules in the LCP procedure. At block 320, the terminal device 105 determines a CAPC associated with each of the determined data units. Based on the multiplexing configuration, at block 325, the terminal device 105 select one or more data units to be multiplexed by restricting the mapping of the data units with CAPC>=X into the MAC PDU if the MAC PDU includes a data unit with CAPC P. The process 300 ends at block 330.

The selected subset of data unit may comprise any suitable number of data units. In some cases, there may be only one data unit (such as a MAC SDU) which is finally selected and multiplexed into the data packet (such as a MAC PDU) by considering the multiplexing configuration or restriction, a configured TB size and other rules or restrictions.

In some example embodiments, the selection restriction related to the channel access priority may be not configured (for example, by default). In this case, the multiplexing of the data packet will not consider a channel access priority of the data unit. For example, any LCH allowed to use the configured grant may be multiplexed into the MAC PDU.

It is to be understood that in the case where one or more MAC CEs are multiplexed into the MAC PDU, the selection configurations or rules for the LCHs (or MAC SDUs) as discussed above may be applicable to the MAC CEs. The details will be omitted for the purpose of simplification.

Still with reference to FIG. 2, at block 210, a selected one or more data units are multiplexed into a data packet, and then, at block 215, the data packet is transmitted.

In some example embodiments, before the transmission of the data packet, a channel access priority may be selected for the data packet from a plurality of channel access priorities associated with the multiplexed data units. Some example embodiments of the present invention provide two selection modes of the channel access priority for the data packet, including the selection of a lower channel access priority (for example, the lowest channel access priority) and the selection of a higher channel access priority (for example, the highest channel access priority). Some example embodiments in this regard will be discussed below with reference to FIG. 4.

Figure 4:
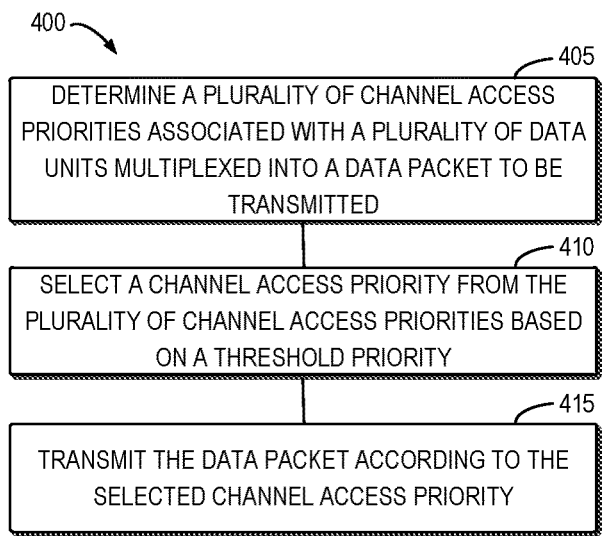
FIG. 4 illustrates a flowchart of an example method of transmitting a data packet according to some example embodiments of the present disclosure.

FIG. 4 shows a flowchart of an example method 400 of transmitting a data packet according to some example embodiments of the present disclosure. The method 400 can be implemented in the case that the data packet is generated according to a legacy LCP procedure based on LCH priorities without taking CAPC of the LCH into account. The method 400 can be implemented by the terminal device 105 or the network device 110 as shown in FIG. 1 in any suitable layer.

As shown, at block 405, a plurality of channel access priorities are determined to be associated with a plurality of data units multiplexed into a data packet to be transmitted. At block 410, a channel access priority is selected based on a threshold priority from the plurality of channel access priorities as the channel access priority for the data packet.

In some example embodiments, the threshold priority may be associated with a channel access priority. In this example, the threshold priority is compared with the plurality of channel access priorities. For example, if at least one of the plurality of channel access priorities is higher than or equal to the threshold priority, a higher channel access priority may be selected from the plurality of channel access priorities. In some example embodiments, the highest channel access priority may be selected. If all of the plurality of channel access priorities are lower than the threshold priority, a lower channel access priority (for example, the lowest channel access priority) may be selected. The threshold priority may be predefined or determined based on the plurality of channel access priorities.

By way of example, in the example embodiments where the method 400 is implemented by a MAC entity of the terminal device 105 for the CAPC selection, two modes, Mode 1 and Mode 2, of the CAPC selection may be defined:

Mode 1—the terminal device 105 shall select the lowest CAPC priority (that is, with a higher number in the Table 5.7.1-1, for example) of the LCH(s) with the MAC SDU multiplexed into the MAC PDU.

Mode 2—the terminal device 105 shall select the highest CAPC priority (that is, with a lower number in the Table 5.7.1-1, for example) of the LCH(s) with the MAC SDU multiplexed into the MAC PDU.

By default, the terminal device 105 may apply Mode 1 to select CAPC which is compatible with the legacy selection behavior or rule as defined in the 3GPP specifications. If (or only if) the MAC PDU contains MAC SDU(s) from LCH(s) with CAPC=<P, then the terminal device 105 may switch to Mode 2 to select CAPC. Alternatively, if the MAC PDU contains MAC SDUs from both LCHs with CAPC<=P and LCHs with CAPC>P, the terminal device 105 should use Mode 2 to select CAPC. The value of P as the third threshold priority can be configurable.

In this way, two selection modes, including the selection of a higher channel access priority and the selection of a lower channel access priority, may be provided. One of the two selection modes may be chosen depending on the channel access priorities or the LCH priorities of the data units multiplexed into the data packet or transport block (TB), which is more flexible. In addition, the transmission efficiency of the data unit with the higher channel access priority or a LCH priority may be improved.

In some other example embodiments, the threshold priority may be used to be compared with a plurality of LCH priorities associated with the multiplexed data units. In this case, after the plurality of LCH priorities are determined, it is be determined whether at least one of the LCH priorities is higher than or equal to the threshold priority. If there is at least one LCH priority higher than or equal to the threshold priority, a higher channel access priority (for example, the highest channel access priority) may be selected. In all of the LCH priorities are lower than the threshold priority, a lower channel access priority (for example, the lowest channel access priority) may be selected.

Other rules or configures for selecting a channel access priority based on the threshold priority may be also possible to determine whether the lower or higher channel access priority is selected. The scope of the present disclosure will not be limited in this regard.

Figure 5:
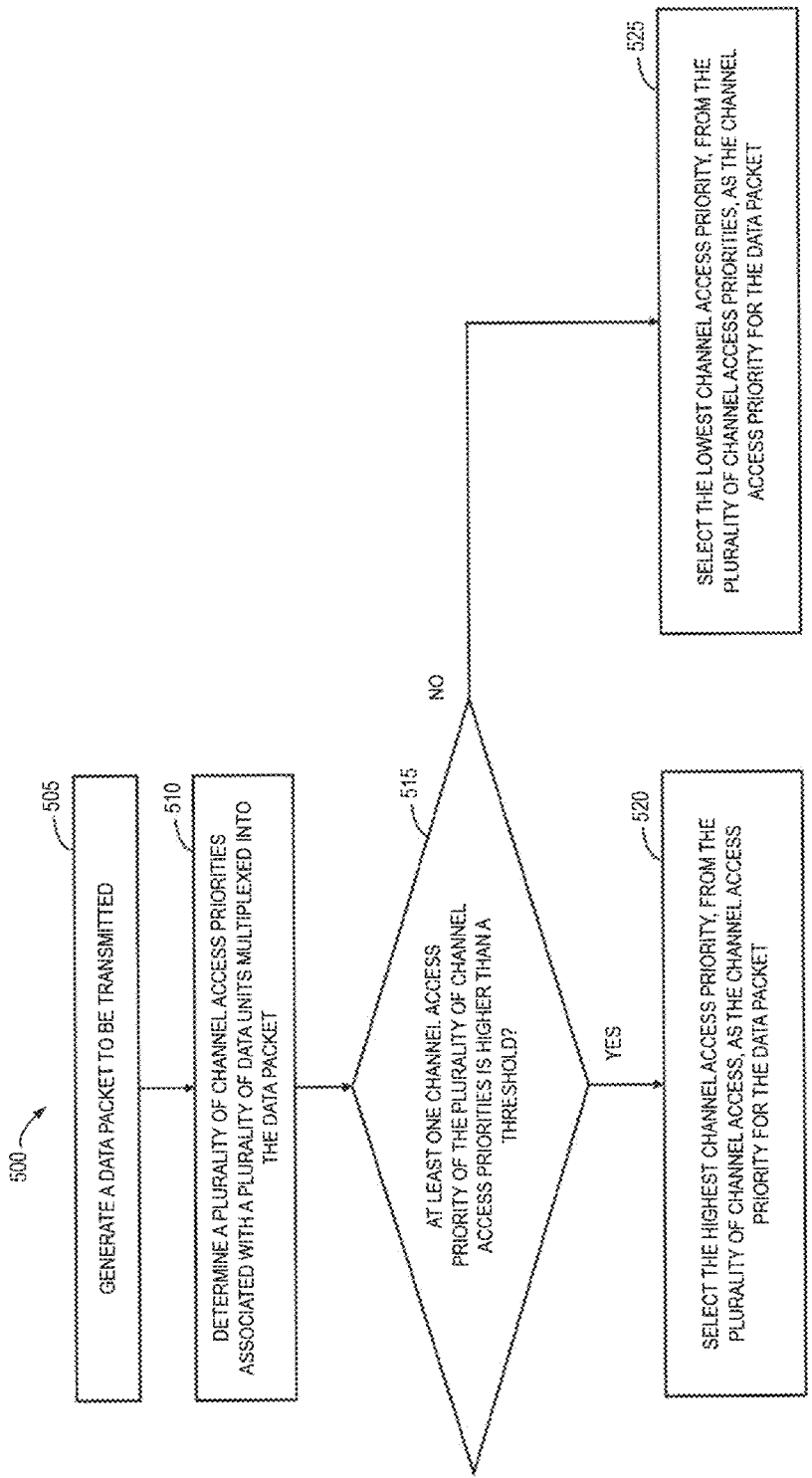
FIG. 5 illustrates a flowchart of an example method of selecting a channel access priority for a data packet to be transmitted according to some example embodiments of the present disclosure.

FIG. 5 shows a flowchart of an example method 500 of selecting a channel access priority for the data packet to be transmitted according to some example embodiments of the present disclosure. In this example, the third channel access priority is the lowest channel access priority, and the fourth channel access priority is the highest channel access priority. The selection modes are chosen based on the channel access priorities of the multiplexed data units.

As shown in FIG. 5, at block 505, a data packet to be transmitted is generated. The generation of the data packet may be implemented according to a legacy LCP procedure based on LCH priorities without considering CAPCs of the LCHs. As an alternative example, the mapping mechanism as described above with reference to FIGS. 1-3 may also be used for generating the data packet.

At block 510, a plurality of channel access priorities are determined to be associated with a plurality of data units multiplexed into the data packet to be transmitted. At block 515, it is determined whether at least one channel access priority of the plurality of channel access priorities is higher than a threshold priority. If yes, at block 520, the highest channel access priority is selected from the plurality of channel access priories as the channel access priority for the data packet. If it is determined that no channel access priority is higher than the threshold priority at block 515, the method 500 proceeds to block 525 where the lowest channel access priority is selected from the plurality of channel access priories as the channel access priority for the data packet.

All operations and features as described above with reference to the method 400 as shown in FIG. 4 are likewise applicable to the method 500 and have similar effects. For the purpose of simplification, the details will be omitted.

Still with reference to FIG. 4, after the channel access priority is selected for the data packet, at block 415, the data packet is transmitted according to the selected channel access priority. For example, in the embodiments where the channel access priority is implemented by a CAPC, when Listen-Before-Talk (LBT) is performed for the transmission the data packet, the size of a contention window may be determined based on the selected CAPC. If the CAPC is higher, there may be more chances to acquire a channel, and, therefore, the transmission efficiency of the data packet may be improved.

Figure 6:
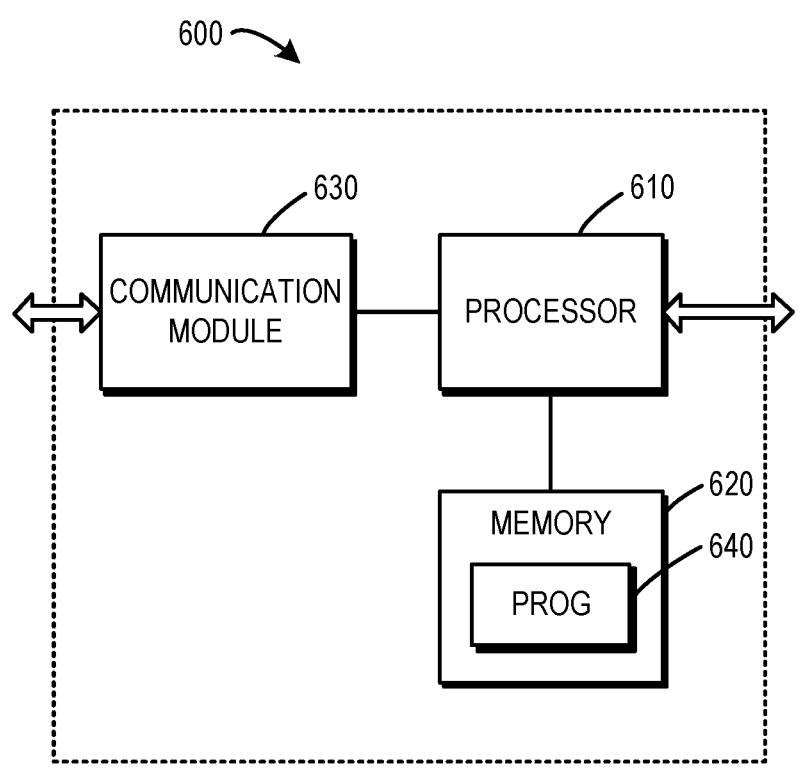
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 can be implemented at or as a part of the terminal device 105 or the terminal device 105 as shown in FIG. 1.

As shown, the device 600 includes a processor 610, a memory 620 coupled to the processor 610, a communication module 630 coupled to the processor 610, and a communication interface (not shown) coupled to the communication module 630. The memory 620 stores at least a program 640. The communication module 630 is for bidirectional communications, for example, via multiple antennas. The communication interface may represent any interface that is necessary for communication.

The program 640 is assumed to include program instructions that, when executed by the associated processor 610, enable the device 600 to operate in accordance with the example embodiments of the present disclosure, as discussed herein with reference to FIGS. 1-5. The example embodiments herein may be implemented by computer software executable by the processor 610 of the device 600, or by hardware, or by a combination of software and hardware. The processor 610 may be configured to implement various example embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

When the device 600 acts as the terminal device 105 or a part of the terminal device 105, the processor 610 and the communication module 630 may cooperate to implement the methods 200-500 as described above with reference to FIGS. 2-5.

All operations and features as described above with reference to FIGS. 1-5 are likewise applicable to the device 600 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 200-500 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage medium.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, a computer readable medium and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a device comprises: at least one processor; and at least one memory including computer program code; the at least one memory and the computer program code configured to, with the at least one processor, cause the device to: select a subset of data units from a set of data units for multiplexing into a data packet, where the selecting is at least in part based on a channel access priority associated with each of the subset of data unit; multiplex the subset of data units into the data packet; and transmit the data packet.

In some example embodiments, the subset of data units is selected further based on a threshold priority.

In some example embodiments, the device is a terminal device, and the device is further caused to: receive, from a network device via radio resource control signaling, a multiplexing configuration indicating the threshold priority.

In some example embodiments, the threshold priority is defined for at least one of a configured grant, a channel access priority, a logical channel priority and a logical channel.

In some example embodiments, the device is caused to select the subset of data units by: selecting, from the set of data units, the subset of data units with a channel access priority higher than or equal to the threshold priority.

In some example embodiments, the threshold priority is predefined.

In some example embodiments, the threshold priority is associated with a channel access priority of a data unit of the subset of data units.

In some example embodiments, the device is caused to select the subset of data units by: selecting, from the set of data units, the subset of data units with a channel access priority below the threshold priority.

In some example embodiments, the device is caused to select, from the set of data units, a plurality of data units according to a descending order of a plurality of channel access priorities associated with the plurality of data units, as the subset of data units.

In some example embodiments, the device is caused to select the subset of data units such that a utilization of a transport block (TB) for the data packet is equal to or higher than a threshold utilization.

In some example embodiments, the device is caused to select the subset of data units such that amount of padding in the data packet is below threshold amount.

In some example embodiments, the device is caused to select, from the set of data units, a predetermined number of data units with highest channel access priorities, as the subset of data units.

In some example embodiments, the data packet comprises a medium access control (MAC) protocol data unit (PDU), and the set of data units comprises a MAC service data unit (SDU) or a MAC control element (CE).

In some aspects, a device comprises: at least one processor; and at least one memory including computer program code; the at least one memory and the computer program code configured to, with the at least one processor, cause the device to: determine a plurality of channel access priorities associated with a plurality of data units multiplexed into a data packet to be transmitted; select a channel access priority from the plurality of channel access priorities based on a threshold priority; and transmit the data packet according to the selected channel access priority.

In some example embodiments, the device is caused to select the channel access priority from the plurality of channel access priorities by: comparing the plurality of channel access priorities with the threshold priority; and in response to at least one of the plurality of channel access priorities being higher than or equal to the threshold priority, selecting the highest channel access priority from among the plurality of channel access priorities.

In some example embodiments, the device is caused to select the channel access priority from the plurality of channel access priorities by: determining a plurality of logical channel priorities associated with the plurality of data units; comparing the plurality of logical channel priorities with the threshold priority; and in response to at least one of the plurality of logical channel priorities being higher than or equal to the threshold priority, selecting the highest channel access priority from the plurality of channel access priorities.

In some example embodiments, the data packet comprises a medium access control (MAC) protocol data unit (PDU), and the plurality of data units comprise a MAC service data unit (SDU) or a MAC control element (CE).

In some aspects, a method comprises: selecting a subset of data units from a set of data units for multiplexing into a data packet, where the selecting is at least in part based on a channel access priority associated with each of the subset of data unit; multiplexing the subset of data units into the data packet; and transmitting the data packet.

In some example embodiments, the subset of data units is selected further based on a threshold priority.

In some example embodiments, the method is implemented at a terminal device, and the method further comprises: receiving, from a network device via radio resource control signaling, a multiplexing configuration indication the threshold priority.

In some example embodiments, the threshold priority is defined for at least one of a configured grant, a channel access priority, a logical channel priority and a logical channel.

In some example embodiments, selecting the subset of data units comprises: selecting, from the set of data units, the subset of data units with a channel access priority higher than or equal to the threshold priority.

In some example embodiments, the threshold priority is predefined.

In some example embodiments, the threshold priority is associated with a channel access priority of a data unit of the subset of data units.

In some example embodiments, selecting the subset of data units comprises: selecting, from the set of data units, the subset of data units with a channel access priority below the threshold priority.

In some example embodiments, selecting the subset of data units comprises: selecting, from the set of data units, a plurality of data units according to a descending order of a plurality of channel access priorities associated with the plurality of data units, as the subset of data units.

In some example embodiments, selecting the subset of data units comprises: selecting the subset of data units such that a utilization of a transport block (TB) for the data packet is equal to or higher than a threshold utilization.

In some example embodiments, selecting the subset of data units comprises: selecting the subset of data units such that amount of padding in the data packet is below threshold amount.

In some example embodiments, selecting the subset of data units comprises: selecting, from the set of data units, a predetermined number of data units with highest channel access priorities, as the subset of data units.

In some example embodiments, the data packet comprises a medium access control (MAC) protocol data unit (PDU), and the set of data units comprises a MAC service data unit (SDU) or a MAC control element (CE).

In some aspects, a method comprises: determining a plurality of channel access priorities associated with a plurality of data units multiplexed into a data packet to be transmitted; selecting a channel access priority from the plurality of channel access priorities based on a threshold priority; and transmitting the data packet according to the selected channel access priority.

In some example embodiments, selecting the channel access priority from the plurality of channel access priorities comprises: comparing the plurality of channel access priorities with the threshold priority; and in response to at least one of the plurality of channel access priorities being higher than or equal to the threshold priority, selecting the highest channel access priority from among the plurality of channel access priorities.

In some example embodiments, selecting the channel access priority from the plurality of channel access priorities comprises: determining a plurality of logical channel priorities associated with the plurality of data units; comparing the plurality of logical channel priorities with the threshold priority; and in response to at least one of the plurality of logical channel priorities being higher than or equal to the threshold priority, selecting the highest channel access priority from the plurality of channel access priorities.

In some example embodiments, the data packet comprises a medium access control (MAC) protocol data unit (PDU), and the plurality of data units comprise a MAC service data unit (SDU) or a MAC control element (CE).

In some aspects, an apparatus comprises: means for selecting a subset of data units from a set of data units for multiplexing into a data packet, where the selecting is at least in part based on a channel access priority associated with each of the subset of data unit; multiplexing the subset of data units into the data packet; and means for transmitting the data packet.

In some example embodiments, the subset of data units is selected further based on a threshold priority.

In some example embodiments, the apparatus is implemented at a terminal device, and the apparatus further comprises: means for receiving, from a network device via radio resource control signaling, a multiplexing configuration indication the threshold priority.

In some example embodiments, the threshold priority is defined for at least one of a configured grant, a channel access priority, a logical channel priority and a logical channel.

In some example embodiments, the means of selecting the subset of data units comprises: means for selecting, from the set of data units, the subset of data units with a channel access priority higher than or equal to the threshold priority.

In some example embodiments, the threshold priority is predefined.

In some example embodiments, the threshold priority is associated with a channel access priority of a data unit of the subset of data units.

In some example embodiments, the means for selecting the subset of data units comprises: means for selecting, from the set of data units, the subset of data units with a channel access priority below the threshold priority.

In some example embodiments, the means for selecting the subset of data units comprises: means for selecting, from the set of data units, a plurality of data units according to a descending order of a plurality of channel access priorities associated with the plurality of data units, as the subset of data units.

In some example embodiments, the means for selecting the subset of data units comprises: means for selecting the subset of data units such that a utilization of a transport block (TB) for the data packet is equal to or higher than a threshold utilization.

In some example embodiments, the means for selecting the subset of data units comprises: means for selecting the subset of data units such that amount of padding in the data packet is below threshold amount.

In some example embodiments, the means for selecting the subset of data units comprises: means for selecting, from the set of data units, a predetermined number of data units with highest channel access priorities, as the subset of data units.

In some example embodiments, the data packet comprises a medium access control (MAC) protocol data unit (PDU), and the set of data units comprises a MAC service data unit (SDU) or a MAC control element (CE).

In some aspects, an apparatus comprises: means for determining a plurality of channel access priorities associated with a plurality of data units multiplexed into a data packet to be transmitted; means for selecting a channel access priority from the plurality of channel access priorities based on a threshold priority; and means for transmitting the data packet according to the selected channel access priority.

In some example embodiments, the means for selecting the channel access priority from the plurality of channel access priorities comprises: means for comparing the plurality of channel access priorities with the threshold priority; and means for in response to at least one of the plurality of channel access priorities being higher than or equal to the threshold priority, selecting the highest channel access priority from among the plurality of channel access priorities.

In some example embodiments, the means for selecting the channel access priority from the plurality of channel access priorities comprises: means for determining a plurality of logical channel priorities associated with the plurality of data units; means for comparing the plurality of logical channel priorities with the threshold priority; and means for in response to at least one of the plurality of logical channel priorities being higher than or equal to the threshold priority, selecting the highest channel access priority from the plurality of channel access priorities.

In some example embodiments, the data packet comprises a medium access control (MAC) protocol data unit (PDU), and the plurality of data units comprise a MAC service data unit (SDU) or a MAC control element (CE).

In some aspects, a computer readable storage medium comprises program instructions stored thereon, the instructions, when executed by a processor of a device, causing the device to perform the method according to some example embodiments of the present disclosure.

What is claimed is:

1. A device comprising:
   at least one processor; and
   at least one memory including computer program code;
   the at least one memory and the computer program code configured to, with the at least one processor, cause the device to:
   receive, from a network device via radio resource control signaling (RRC), a multiplexing configuration indicating a threshold priority;
   select a channel access priority from a plurality of channel access priorities based on a threshold priority;
   select a subset of data units from a set of data units for multiplexing into a data packet, wherein the data packet includes a medium access control (MAC) protocol data unit (PDU), wherein the selecting is at least in part based on a channel access priority associated with each of the subset of data units, wherein the set of data units includes all available data units determined after a logical channel prioritization, and wherein the selected subset of data units includes data units having a relative channel access priority that include a predefined number of steps below a data unit having a highest channel access priority, wherein a channel access priority class (CAPC) priority associated with a data unit is determined to be a CAPC configured for a Data Radio Bearer (DRB) to which the data unit belongs, wherein the selecting is based on:
   generating the data packet to be transmitted;
   determining a plurality of channel access priorities associated with a plurality of data units multiplexed into the data packet to be transmitted, wherein the plurality of data units include a MAC service data unit (SDU) or a MAC control element (CE);
   selecting, from the set of data units, the plurality of data units according to a descending order of a plurality of channel access priorities associated with the plurality of data units, as the subset of data units;
   determining if at least one channel access priority of the plurality of channel access priorities is higher than the threshold priority, wherein the threshold priority is defined for a configured grant, the channel access priority, a logical channel priority, and a logical channel, and wherein the threshold priority is associated with the channel access priority of one of the selected subset of data units;
   in a case where the least one channel access priority of the plurality of channel access priorities is higher than the threshold priority, selecting the highest channel access priority from the plurality of channel access priorities as the channel access priority for the data packet; and
   in a case where no channel access priority of the plurality of channel access priorities is higher than the threshold priority, selecting a lowest channel access priority from the plurality of channel access priorities as the channel access priority for the data packet;
   wherein selection of the subset of data units is based on utilization of a transport block (TB) for the data packet being equal to a threshold utilization;
   wherein after the subset of data units is selected, it is determined whether an amount of padding in the data packet is higher than a threshold amount of padding, based on the determination a further data unit is selected;
   multiplex the subset of data units into the data packet; and
   transmit the data packet according to the selected channel access priority,
   wherein the plurality of data units belongs or corresponds to different logical channels (LCHs), the threshold priority may be set as CAPC X, where X>P and P is a CAPC of a data unit of the plurality of data units.

* * * * *